April 21, 1925.  J. H. ANSON  1,534,253

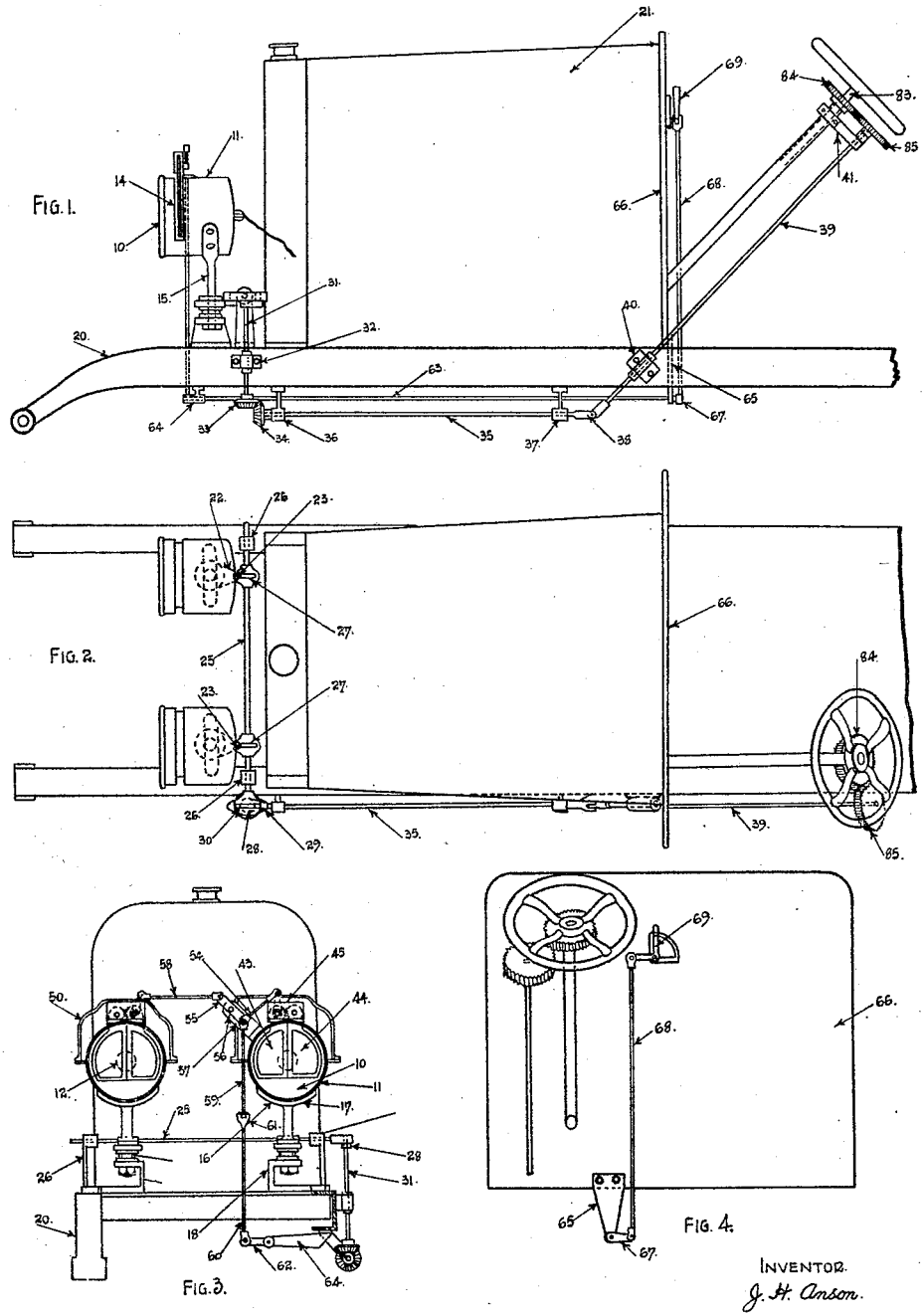

VEHICLE HEADLIGHT

Filed Oct. 30, 1924  2 Sheets-Sheet 2

INVENTOR.
J. H. Anson.
BY
E. J. Fetherstonhaugh
ATTY.

Patented Apr. 21, 1925.

1,534,253

UNITED STATES PATENT OFFICE.

JOSEPH HENRY ANSON, OF SOUTH PORCUPINE, ONTARIO, CANADA, ASSIGNOR TO ALFRED HENRY REAMSBOTTOM, OF SOUTH PORCUPINE, CANADA.

VEHICLE HEADLIGHT.

Application filed October 30, 1924. Serial No. 746,826.

*To all whom it may concern:*

Be it known that I, JOSEPH HENRY ANSON, a citizen of the United States of America, residing at the town of South Porcupine, in the District of Temiscaming, in the Province of Ontario and Dominion of Canada, have invented new and useful Vehicle Headlights, of which the following is a specification.

The invention relates to vehicle headlights as described in the present specification and illustrated in the accompanying drawings which form part of the same.

The invention consists essentially of the novel features pointed out broadly and specifically in the claims for novelty following a description containing an explanation in detail of an acceptable form of the invention.

The objects of the invention are to eliminate the dangers incident to the glare of motor car headlights in the meeting of cars on the highways at night; to indicate from one car to the other exact positions and intentions; to facilitate turning movements; to insure the constant attention of the driver to his operations in passing another vehicle by furnishing him with facilities operable in advance; and generally to provide a safe and efficient means for signalling other cars or vehicles, that is economical in regard to equipment and easy to operate.

In the drawings, Figure 1 is a side elevation of the invention showing the operative connections to the dashboard of a vehicle.

Figure 2 is a plan view of the headlights secured to a vehicle and disclosing the operative connections.

Figure 3 is a front elevation view of the headlights secured to a vehicle.

Figure 4 is a face view of the dashboard in a vehicle showing the operating means for the headlights.

Like numerals of reference indicate corresponding parts in the various figures.

Figure 5:
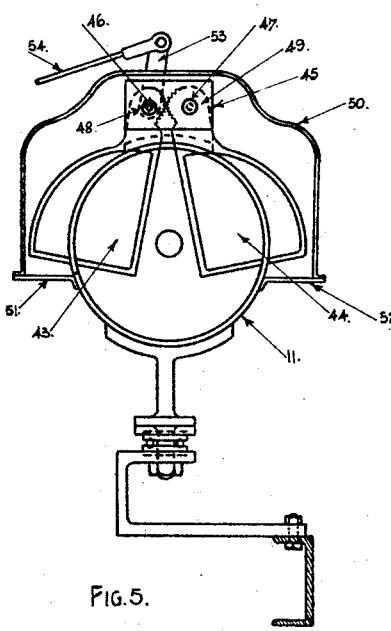
Figure 5 is an enlarged detail of one of the headlights showing the lenses open to the limit of the outer casing.

Referring to the drawings, the headlights 10 are formed in casings 11 having the lamps 12 and suitably wired. The slots 14 are cut around the upper portions and sides of the casings 11 of the headlights, while their undersides have supporting spindles 15 in which their retaining members 16 and 17 are bolted on to the casings 11.

The supporting spindles 15 are mounted on brackets 18 being rigidly connected to the frame 20 of the car 21.

A horizontal bar 25 is supported from the frame 20 by means of the guide brackets 26 in which it is free to slide in a horizontal plane and in a direction transverse to the length of the car. The slots 27 are made in the horizontal bar 25 which is engaged in said slots 27 by the pins 23 of the arms 22 secured to the supporting spindles 15.

One end of the horizontal bar 25 is operatively connected to a crank member 28 at the upper end of the vertical shaft 31 by means of the crank pin 29, the latter engaging in a slot 30 in said horizontal bar 25. The vertical shaft 31 is mounted in the bearing bracket 32 secured to the frame 20.

To the lower end of the vertical shaft 31 a bevel gear 33 is keyed, which co-acts with another bevel gear 34 keyed to the longitudinal shaft 35 supported by the bearing brackets 36 and 37 from the frame 20.

The shaft 35 is flexibly connected at its other end through the universal joint 38 to the operating rod 39 which extends upwardly through the dashboard 66 and parallel to the steering column. The rod 39 is journalled in the bearing brackets 40 and 41 and carries at the upper end the gear 85 co-acting with the gear 84 mounted on the steering post 83.

Figure 6:
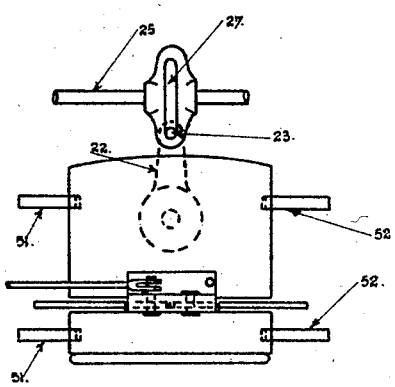
Figure 6 is an enlarged plan view of the headlight illustrated in Figure 5.
Figure 9:
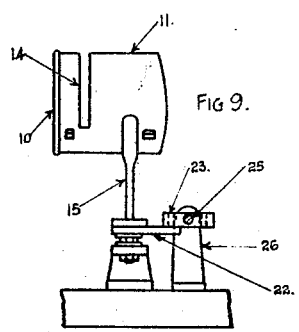
Figure 9 is an enlarged detail of the operating connections from a headlight to the operating rod.

In Figures 3, 5 and 6 a frame 50 is shown supported from the headlight casing 11 by the brackets 51 and 52 and this frame is slotted to register with the slots 14 in the headlight casing 11.

The lenses 43 and 44 are preferably green and red in color for clear and danger signals, the red being on the inside in each headlight and the green on the outside. The lenses 43 and 44 cover the upper portion of the headlight lenses and fold inwardly from either side and meet centrally in consequence on turning of the headlights following the operation of the steering gear, the red light is turned outwardly and shines to the front on the turning side and in the other side inwardly, therefore the green light will shine to the side on the turning side and to the front on the other side, which indicates danger from the front on the turning side and clear on the other side.

The frames of the lenses 43 and 44 are segmental in shape and pivotally secured through the pinion lugs 48 and 49 by the pivots 46 and 47 secured in the frames 45 supported by the headlight casings 11.

The teeth of the pinion lugs 48 and 49 co-act and the crank 53 is mounted on the pivot 46 and this crank is pivotally secured to the connecting rod 54. The rod 54 is pivotally connected with a rocker arm 55 and a similar rod 58 is also pivotally connected to the other end of said rocker arm, the latter being pivoted at 56. The connecting rod 60, having the intermediate universal joint 61, pivotally joins the rocker arm 55 to the crank 62 on the crank shaft 63, the latter being journalled in the bearing bracket 65 and having the operating crank 67 at the inner extremity thereof. The crank lever 69 pivotally secured to a segment track on the dash is pivotally joined to the crank 67 by the rod 68, so that on operating the crank lever 69, the shaft 63 is rotated and this operates the rocker arm 55, the connecting rod 60 and the rods 54 and 58 are pulled, which bring the pinion lugs at both headlights into co-action and thereby parts the lights 43 and 44 to open up the lenses of the headlights for better visibility on the road.

Figure 7:
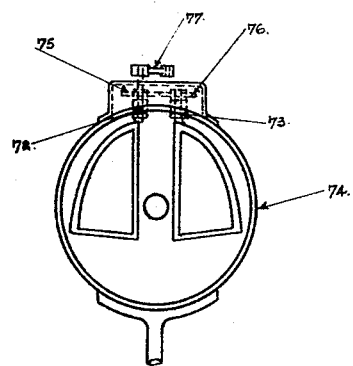
Figure 7 is an enlarged detail of a headlight showing another form of the invention.
Figure 8:
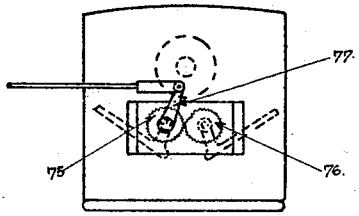
Figure 8 is an enlarged plan view of the modified headlight shown in Figure 7.

In Figures 7 and 8 only a slight variation of the structure is shown in regard to the lenses 43 and 44 as they are in this form of the invention entirely inside the headlight casings 74 and are pivotally secured by means of the pivots 72 and 73 through the top of the casings, the pivots having the pinions 75 and 76 mounted thereon and co-acting one with the other.

The crank 77 is mounted in each mechanism in the pivot 72 for the connecting rods as described hereinbefore.

In the operation, the lenses under ordinary conditions are closed and operate with the steering mechanism as already pointed out, but for greater visibility on the highways, the lenses are parted, which throws a concentrated or spot light ahead and as the lower portions of the device are always uncovered, this insures a good view of the roadway within municipalities and on the highways, consequently all conditions are provided for and the danger signals effect safe crossing for the vehicles, as in any position, the colored lights will afford sure indication as to the position of the approaching vehicle.

What I claim is:

1. In vehicle headlights, a pair of headlights standing on supporting spindles, suitably journalled in rigid bearing brackets, a horizontal bar at the rear of said headlights and operatively connected thereto having a slot engaging a crank pin of a vertical shaft, said vertical shaft operatively connected to a rod gear of a steering mechanism, lenses in contrasting colors in each of said headlight and pivotally supported to close over the upper portion of the headlight, a rod gear operatively connecting said lenses to an operating member in the vehicle, and rotatable headlights connected to said rod gear and steering mechanism.

2. In vehicle headlights, a pair of headlights standing on supporting spindles suitably journalled in rigid bearing brackets, a horizontal bar at the rear of said headlights and operatively connected thereto, a vertical shaft held to said horizontal bar, and having a bearing bracket secured to the frame, a pair of lenses in contrasting colors in each of said headlights and pivotally supported to close over the upper portion of the headlight lenses, a rod gear operatively connecting said lenses to an operating member in the vehicle, a rod gear operatively connected to the rotatable headlights and to the steering mechanism.

3. In vehicle headlights, a pair of headlights standing on supporting spindles suitably journalled in rigid bearing brackets, a horizontal bar at the rear of said headlights and operatively connected thereto, a vertical shaft held to said horizontal bar and having at its lower end a bevel gear, a longitudinal shaft having a bevel gear co-acting with said vertical shaft, a pair of lenses in contrasting colors in each of said headlights and pivotally supported to close over the upper portion of the headlights, a rod gear operatively connecting said lenses to an operating member in the vehicle, a rod gear flexibly connected to said longitudinal shaft and the rotatable headlights and to the steering mechanism.

4. In vehicle headlights, a pair of headlights standing on supporting spindles suitably journalled in rigid bearing brackets, a horizontal bar at the rear of said headlights and operatively connected thereto, a vertical shaft held to said horizontal bar and co-acting with a longitudinal shaft, bearing brackets holding said longitudinal shaft to a frame, a pair of lenses in contrasting colors in each of said headlights and pivotally supported to close over the upper portion of the headlights, a rod gear operatively connecting said lenses to an operating member in the vehicle, a rod gear flexibly connected to said longitudinal shaft and extending upwardly through the dashboard of said vehicle and having gears co-acting with gears from the steering mechanism.

5. In vehicle headlights, a pair of headlights standing on vertical shafts suitably journalled in rigid bearing brackets, a pair of lenses in contrasting colors in each of said headlights, and pivotally supported to close over the upper portion of said headlights, frames supported from casings of said headlights having slots registering with slots in said casings, a rod gear operatively connecting said lenses to an operating member in the vehicle, a steering mechanism and a rod gear operatively connected to the rotatable headlights and to the steering mechanism.

6. In vehicle headlights, a pair of headlights standing on vertical shafts suitably journalled in rigid bearing brackets, a pair of lenses in contrasting colors in each of said headlights, said lenses being segmental in form and having pinion lugs pivotally supported to close over the upper portion of said headlights, a rod gear operatively connecting said lenses to an operating member in the vehicle, a steering mechanism and a rod gear operatively connected to the rotatable headlights and to the steering mechanism.

7. In vehicle headlights, a pair of headlights standing on vertical shafts suitably journalled in rigid bearing brackets, a pair of lenses in contrasting colors in each of said headlights, pivots securing said lenses to frames supported by casings of said headlights, said pivots supporting the lenses to close over the upper portion of said headlights, a rod gear operatively connecting said lenses to an operating member in the vehicle, a steering mechanism and a rod gear operatively connected to the rotatable headlights and to the steering mechanism.

8. In vehicle headlights, a pair of headlights standing on vertical shafts suitably journalled in rigid bearing brackets, a pair of lenses in contrasting colors in each of said headlights and pivotally supported to close over the upper portion of said headlights, a crank arm projecting from one of said pivots and secured to a connecting rod operatively secured to a rod gear connecting said lenses to an operating member in the vehicle, a steering mechanism and a rod gear operatively connected to the rotatable headlights and steering mechanism.

9. In vehicle headlights, a pair of headlights standing on vertical shafts suitably journalled in rigid bearing brackets, a pair of lenses in contrasting colors in each of said headlights and pivotally supported to close over the upper portion of said headlights, a crank arm projecting from one of said pivots and secured to a connecting rod, a rocker arm held to said connecting rod, and a flexible connecting rod connected to the other end of said rocker arm, and a rod gear connecting said lenses to an operating member in the vehicle, a steering mechanism and a rod gear operatively connected to the rotatable headlights and steering mechanism.

10. In vehicle headlights, a pair of headlights standing on vertical shafts suitably journalled in rigid bearing brackets, a pair of lenses in contrasting colors in each of said headlights and pivotally supported to close over the upper portion of said headlights, a crank arm projecting from one of said pivots and secured to a connecting rod, a rocker arm having a flexible connecting rod held to said rod from the crank arm, a crank shaft secured to said flexible connecting rod and journalled in a bearing bracket and an operating crank at the end thereof, and connections to an operating member in the vehicle for said lenses, a steering mechanism and a rod gear operatively connected to the rotatable headlights and steering mechanism.

11. In vehicle headlights, a pair of headlights standing on vertical shafts suitably journalled in rigid bearing brackets, a pair of lenses in contrasting colors in each of said headlights and pivotally supported to close over the upper portion of said headlights, a crank arm projecting from one of said pivots and secured to a connecting rod, a rocker arm having a flexible connecting rod held to said rod from the crank arm, a crank shaft secured to said flexible connecting rod and journalled in a bearing bracket and an operating crank at the end thereof, a rod projecting upwardly therefrom and having at its upper end a crank lever for regulating said lenses, a steering mechanism and a rod gear operatively connected to the rotatable headlights and steering mechanism.

12. In vehicle headlights, a pair of headlights standing on vertical shafts suitably journalled in rigid bearing brackets, a pair of lenses in contrasting colors in each of said headlights and pivotally secured through the top of the casings of said headlights, and pinions mounted thereon coacting with one another, and rod gear operatively connecting said lenses to an operating member in the vehicle, a steering mechanism and a rod gear operatively connected to the rotatable headlights and to the steering mechanism.

In testimony whereof I have affixed my signature this 24th day of September, 1924, at the town of South Porcupine.

JOSEPH HENRY ANSON.